United States Patent
Kuwabara et al.

(10) Patent No.: US 8,584,479 B2
(45) Date of Patent: Nov. 19, 2013

(54) AIR CONDITIONER HAVING A DESICCANT ROTOR WITH MOISTURE ADSORBING AREA

(75) Inventors: Osamu Kuwabara, Ora-gun (JP); Reinhard Radermacher, Silver Spring, MD (US); Yunho Hwang, Ellicott City, MD (US); Jiazhen Ling, College Park, MD (US)

(73) Assignees: Sanyo Electric Co., Ltd., Osaka (JP); University of Maryland, College Park, MD (US)

( * ) Notice: Subject to any disclaimer, the term of this patent is extended or adjusted under 35 U.S.C. 154(b) by 506 days.

(21) Appl. No.: 12/850,943

(22) Filed: Aug. 5, 2010

(65) Prior Publication Data

US 2012/0031133 A1    Feb. 9, 2012

(51) Int. Cl.
*F25D 23/00* (2006.01)

(52) U.S. Cl.
USPC ............. 62/271; 62/274; 62/89; 62/91

(58) Field of Classification Search
USPC ............................ 62/271, 274, 89, 91
See application file for complete search history.

(56) References Cited

U.S. PATENT DOCUMENTS

| | | | | |
|---|---|---|---|---|
| 4,474,021 | A * | 10/1984 | Harband | 62/94 |
| 7,930,896 | B2 * | 4/2011 | Matsui et al. | 62/238.3 |
| 2004/0112077 | A1 * | 6/2004 | Forkosh et al. | 62/271 |
| 2009/0314266 | A1 * | 12/2009 | Hori et al. | 123/568.12 |
| 2010/0307175 | A1 * | 12/2010 | Teige et al. | 62/94 |

FOREIGN PATENT DOCUMENTS

| | | |
|---|---|---|
| JP | 2001-241693 | 9/2001 |
| JP | 2005-201624 | 7/2005 |

* cited by examiner

*Primary Examiner* — Marc Norman
*Assistant Examiner* — Ana Vazquez
(74) *Attorney, Agent, or Firm* — McDermott Will & Emery LLP

(57) ABSTRACT

An air conditioner having a refrigeration cycle including a compressor, a radiator, a pressure-reducing device and an evaporator, a total heat exchanger for performing heat-exchange between outdoor air and air under cooling operation using the evaporator for a room to be air-conditioned, and for ventilating the room to be air-conditioned, and a desiccant rotor having a moisture adsorbing area for adsorbing moisture in the outdoor air when the outdoor air is introduced, and regenerating the moisture adsorbing area by heat of the radiator, the outdoor air successively flowing through the total heat exchanger, the evaporator and the moisture adsorbing area in this order and then entering the room to be air-conditioned.

20 Claims, 6 Drawing Sheets

AIR CONDITIONER HAVING A DESICCANT ROTOR WITH MOISTURE ADSORBING AREA

BACKGROUND OF THE INVENTION

1. Technical Field

The present invention relates to an air conditioner for cooling and dehumidifying a room to be air-conditioned.

2. Related Art

An air conditioner, having a cooling operation function and a dehumidifying operation function has hitherto adopted a weak-cooling or re-heating dehumidifying operation function. Under weak-cooling humidifying operation, the temperature of a room to be air-conditioned decreases simultaneously with dehumidification. Therefore, this operation has a problem that the dehumidification amount is also reduced with time lapse or user's feeling temperature is reduced, so that users have feeling of discomfort. The re-heating dehumidifying operation temporarily reduces the temperature of air to condense water in the air. The temperature-reduced air is then re-heated and supplied to a room to be air-conditioned. This operation has a problem that either the cooling capacity decreases or energy consumption increases.

Therefore, there has been recently known an air conditioner which adopts a combination of a refrigeration cycle including a compressor, a radiator, an expansion valve and an evaporator and a desiccant rotor as moisture adsorbing means as disclosed in JP-A-2001-241693. According to this type of air conditioner, outdoor air taken into the air conditioner is made to flow through a desiccant so that moisture in the take-in air is adsorbed in a moisture adsorbent area of the desiccant rotor, the thus-dehumidified air is supplied to the evaporator to adsorb heat, and then the air which has been set to proper temperature and humidity as described above is supplied into a room to be air-conditioned. The moisture adsorbed in the desiccant rotor is desorbed from the desiccant rotor by using exhaust heat from the radiator in a regenerating area of the desiccant rotor, thereby regenerating the desiccant rotor.

Air conditioners utilizing desiccant rotors for dehumidification have traditionally been constructed so that air taken into the air conditioner is first dehumidified by the desiccant rotor and then the dehumidified air is made to flow into an evaporator, thus reducing the latent heat load in the evaporator. The dehumidification capacity of the desiccant increase as the relative humidity difference between the moisture-adsorbing area and the regenerating area of the desiccant rotor increases. Therefore, in order to enhance the dehumidification performance of the desiccant rotor, it is required to either increase the temperature of the regenerating area or increase the relative temperature of the regenerating area by the flow of cooling air to the processing side. However, when the air taken into the air conditioner is made to directly flow to the desiccant as a first step in air conditioning, there is a problem that the temperature of the moisture-adsorbing area of the desiccant is risen, and thus the dehumidifying performance of the desiccant is lowered.

Furthermore, in order to enhance the dehumidifying performance of the desiccant, it is required to increase the temperature of the regenerating area, so that the load at the refrigeration cycle side is increased and the efficiency of the refrigeration cycle is lowered.

Furthermore, adsorbents used as desiccant material, such as silica gel, zeolite or the like, adsorb moisture at relatively low humidity. It is necessary to heat these adsorbents up to 80 to 150 deg C. to desorb the moisture. Recently, an air conditioner using a heat pump type refrigeration cycle containing carbon dioxide gas refrigerant, and having a low global warming potential (GWP) has been promoted for development. However, even in a heat pump type refrigeration cycle having large exhaust heat, air is heated to 60 to 80° C. at the highest by heat from a radiator. This temperature range is insufficient for regeneration of the desiccant. Accordingly, as disclosed in JP-A-2005-201624, supplied air is cooled by a low-temperature heat source (evaporator) of the heat pump before moisture in the supplied air is adsorbed by the desiccant rotor, whereby the temperature difference between the adsorbing area and the regenerating area of the desiccant rotor is increased and the dehumidifying performance of the desiccant rotor is enhanced.

However, when the evaporator is placed in the upstream side of the air supply side of the desiccant, the latent heat load in the evaporator cannot be reduced. Furthermore, the temperature of supplied air which has passed through the desiccant is increased by adsorbent heat. Therefore, the load on the refrigeration cycle increases, and in the heat pump type refrigeration cycle, which originally has a low refrigeration cycle efficiency when it is used for cooling, either sufficient cooling capacity cannot be obtained or the temperature of the moisture adsorbing area of the desiccant rotor increases and regeneration of the desiccant rotor is insufficient.

SUMMARY OF THE INVENTION

According to an aspect of the present invention, there is provided an air conditioner comprising: a refrigeration cycle including a compressor, a radiator, a pressure-reducing device and an evaporator; a total heat exchanger for performing heat-exchange between outdoor air and air under cooling operation using the evaporator for a room to be air-conditioned, and for ventilating the room to be air-conditioned; and a desiccant rotor having a moisture adsorbing area for adsorbing moisture in the outdoor air when the outdoor air is introduced, and regenerating the moisture adsorbing area by heat of the radiator, the outdoor air successively flowing through the total heat exchanger, the evaporator and the moisture adsorbing area in this order and then entering the room to be air-conditioned.

The above air conditioner may further comprise a single housing, wherein the refrigeration cycle, the total heat exchanger and the desiccant rotor are integrally mounted in the housing, and the housing and the room to be air-conditioned are connected to each other through an air exhaust passage and an air introducing passage.

In the above air conditioner, air from the exhaust passage may be mixed with outdoor air introduced through the total heat exchanger in the housing and the mixed air may flow in first to third directions, the first direction being defined by a direction along which the mixed air passes through the evaporator, bypasses the desiccant rotor and then returns to the room to be air-conditioned, the second direction being defined by a direction along which the mixed air successively flows through the evaporator and the moisture adsorbing area in this order and then returns to the room to be air-conditioned, and the third direction being defined by a direction along which the mixed air is passed through the total heat exchanger and then exhausted to the outside of the air conditioner.

In the above air conditioner, in the housing, air from the exhaust passage may be passed through the total heat exchanger and then exhausted to the outside of the air conditioner, and a part of the air concerned may pass through the evaporator, bypass the desiccant rotor and then return to the room to be air-conditioned, and outdoor air introduced through the total heat exchanger may successively flow through the evaporator and the moisture adsorbing area in this order and then enters the room to be air-conditioned.

The above air conditioner may further comprise one or plural indoor units each of which contains an indoor heat exchanger, the indoor heat exchanger being connected to the compressor in parallel to the evaporator.

In the above air conditioner, in the housing, air from the exhaust passage may be passed through the total heat exchanger and exhausted to the outside of the air conditioner, and outdoor air introduced through the total heat exchanger may successively flow through the evaporator and a moisture adsorbing area of the desiccant rotor in this order and then return to the room to be air-conditioned.

In the above air conditioner, the housing may be placed in attic or crawlspace of a building.

In the above air conditioner, the desiccant rotor may have a moisture adsorbing area, the radiator may be sectioned into plural sub radiators arranged along a refrigerant flowing direction, and the moisture adsorbing area of the desiccant rotor may be regenerated by heat of a sub radiator located at the most upstream side with respect to the refrigerant flowing direction.

In the above air conditioner, a sub radiator located at the most downstream side with respect to the refrigerant flowing direction out of the plural sub radiators may be provided with a water sprinkling unit for sprinkling water.

In the above air conditioner, the sub radiator located at the most downstream side with respect to the refrigerant flowing direction may be connected to the room to be air-conditioned through an air introducing passage, whereby the radiator radiates heat by using heat of the air from the air-conditioned room.

DETAILED DESCRIPTION OF THE PREFERRED EMBODIMENTS

Preferred embodiments according to the present invention will be described hereunder.

Figure 1:
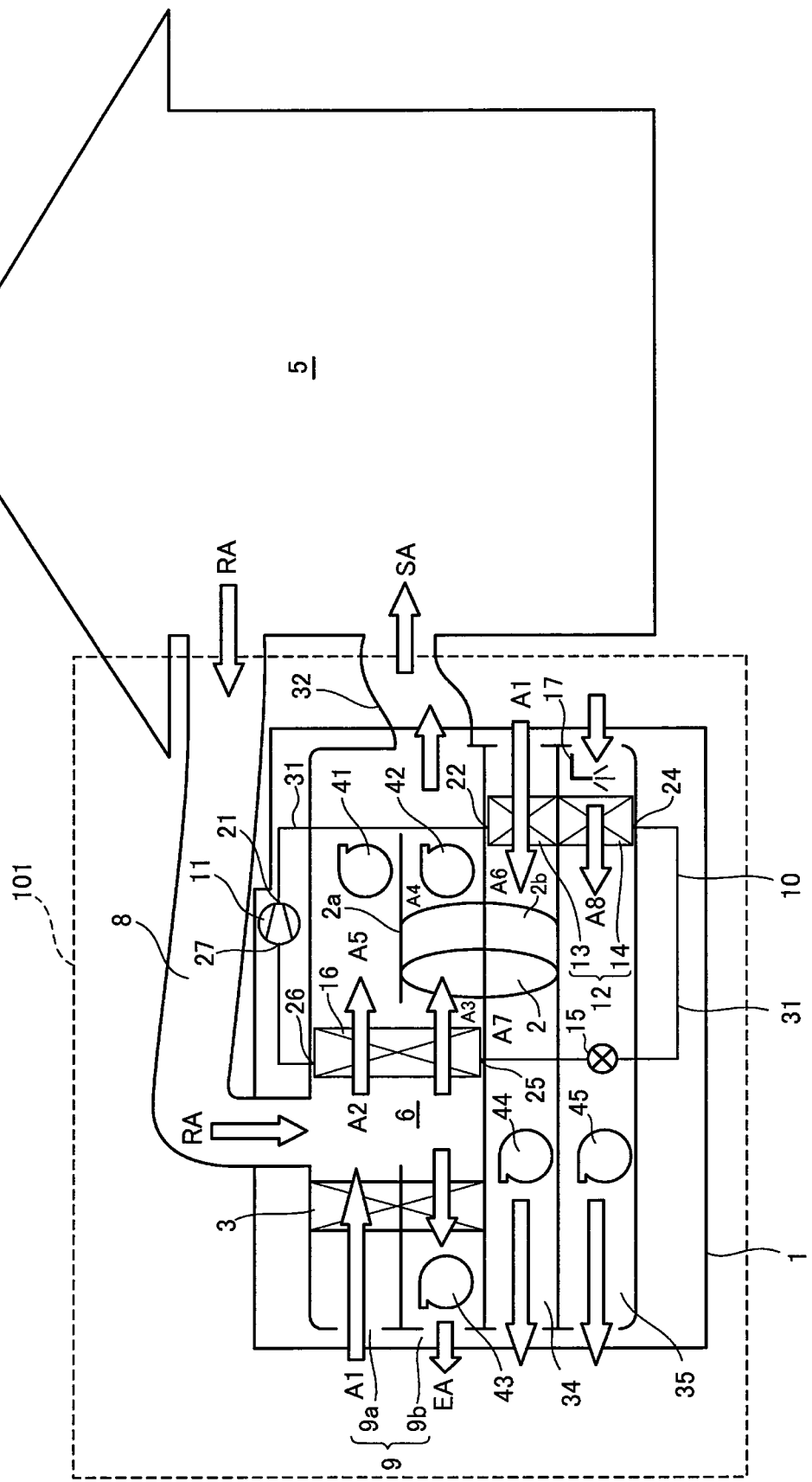
FIG. 1 is a diagram showing the construction of an air conditioner according to a first embodiment to which the present invention is applied.

FIG. 1 is a diagram showing the construction of an air conditioner 101 according to a first embodiment to which the present invention is applied.

The air conditioner 101 has a refrigeration cycle 10, a desiccant rotor 2 for adsorbing moisture in air, and a total heat exchanger 3 provided to an air suction/exhaust port 9 of the air conditioner 101. The refrigeration cycle 10, the desiccant rotor 2 and the total heat exchanger 3 are integrally provided in a housing 1. The air conditioner 101 is disposed outdoors, and the air conditioner 101 and a room to be air-conditioned (hereinafter merely referred to as "air-condition room") 5 are connected to each other through an air introducing passage 32.

The refrigeration cycle 10 is configured so that a compressor 11, a radiator 12, a pressure-reduced device (e.g. expansion valve) 15 and an evaporator 16 are connected to one another through a refrigerant pipe 31.

A chamber 6 is provided between the total heat exchanger 3 and the evaporator 16. An exhaust passage 8 for introducing air RA returned from the air-conditioned room 5 into the chamber is connected to the chamber 6. A first exhaust blower 43 for exhausting exhaust air EA to the outside of the air conditioner 101 is provided at the exhaust port 9b side in the neighborhood of the total heat exchanger 3.

The desiccant rotor 2 is provided with a moisture adsorbent which can adsorb and discharge moisture, and it is formed of a rotary type moisture adsorbing member which is designed in a disc-like shape having any thickness and has a rotating shaft. The moisture adsorbent is formed of either high polymer adsorbent having high regeneration performance even at low temperature, or silica gel, zeolite, cross-linked polyethylene or the like. The desiccant rotor 2 is designed so that the moisture adsorbing face thereof is disposed vertically to the flow of air in the air conditioner 101. The desiccant rotor 2 is rotated at a low speed around the air flowing direction (axial center) in the air conditioner 101 by an electric motor (not shown). Paying attention to a part of the desiccant rotor 2, the part concerned repeats such a cycle as to pass through a moisture adsorbing area 2a parallel to the evaporator 16, shift to a regenerating area 2b parallel to the radiator 12 and then return to the moisture adsorbing area 2a again.

A first air suction blower 42 for dehumidified air into the air-conditioned room 5 is provided in the neighborhood of the moisture adsorbing area 2a of the desiccant rotor 2. A second exhaust blower 44 which serves as an air blowing unit for blowing air to the radiator 12 and exhausts to the outdoor air which is passed through the regenerating area 2b and has high humidity is provided in the neighborhood of the regenerating area 2b of the desiccant rotor 2. Under a condition in which the latent heat load of the air conditioner 101 is reduced, for example, when the outdoor air has low humidity, the dehumidifying capacity (performance) can be easily controlled by reducing the rotational number of the desiccant rotor 2.

Refrigerant flowing in the refrigerant pipe 31 of the refrigeration cycle 10 may be carbon dioxide or HFC such as R410A or the like. In this embodiment, the refrigeration cycle 10 is a heat pump type refrigeration cycle using carbon dioxide gas refrigerant having a low global warming potential (GWP).

The refrigerant discharge port 21 of the compressor 11 intercommunicates with the refrigerant inlet 22 of the radiator 12. The radiator 12 is compartmented into a refrigerant upstream side radiator 13 and a refrigerant downstream side radiator 14. The refrigerant outlet of the refrigerant upstream side radiator intercommunicates with the refrigerant inlet of the refrigerant downstream side radiator 14. The refrigerant outlet of the refrigerant downstream side radiator 14 intercommunicates with the refrigerant inlet 25 of the evaporator 16 through the pressure-reducing device 15. The refrigerant outlet 26 of the evaporator 16 intercommunicates with the refrigerant suction port 27 of the compressor 11.

The radiator 12 and the evaporator 16 are heat exchangers for performing heat-exchanging between refrigerant and air, and tube fin type or micro-channel type heat exchangers or the like may be used. A second air suction blower 41, which serves as an air blowing unit for blowing air to the evaporator 16 and also introduces air cooled by the evaporator 16 into the air-conditioned room 5, is provided in the neighborhood of the evaporator 16. A water sprinkling unit 17 for sprinkling water to the refrigerant downstream side radiator 14 to perform evaporative cooling as well as a third exhaust blower 45 serving as an air blowing unit for blowing air to the refrigerant downstream side radiator 14 are provided in the neighborhood of the refrigerant downstream side radiator 14.

The high-temperature and high-pressure refrigerant which is compressed to fall into a supercritical state by the compressor 11 flows into the radiator 12, and radiates heat with keeping the supercritical state. Specifically, the refrigerant first flows into the refrigerant upstream side radiator 13, heat-exchanges with the outdoor air blown by the second exhaust blower 44 to radiate heat, and then flows out of the refrigerant upstream side radiator 13. The refrigerant leaving from the refrigerant upstream side radiator 13 flows into the refrigerant downstream side radiator 14, and the outdoor air is blown to the refrigerant downstream side radiator 14 by the third exhaust blower 45, and water is sprinkled (sprayed) to the outdoor air by the water sprinkling (spraying) unit 17 so that evaporative cooling is applied to the outdoor air concerned, thereby cooling the refrigerant downstream side radiator 14.

According to this construction, the radiator 12 has the refrigerant downstream side radiator 14 as a second radiator which is provided at the refrigerant downstream side of the refrigerant upstream side radiator 13. Therefore, the temperature of the refrigerant can be further reduced to a lower temperature in the refrigerant downstream side radiator 14. Furthermore, water is sprinkled to the refrigerant downstream side radiator 14 by the water sprinkling unit 17, whereby evaporative cooling can be applied to the outdoor air for radiation and thus the temperature of the refrigerant flowing through the refrigerant downstream side radiator 14 can be reduced. Furthermore, the cooling efficiency of the refrigerant downstream side radiator 14 is remarkably enhanced by sprinkling water to the refrigerant downstream side radiator 14, so that the refrigerant downstream side radiator 14 can be miniaturized.

The refrigerant discharging from the refrigerant downstream side radiator 14 passes through the refrigerant pipe 31, and enters the pressure-reducing device 15 to be reduced in pressure. The refrigerant, which pressure is reduced in the pressure-reducing device 15, falls into a gas-liquid two-phase state. The refrigerant in the gas-liquid two-phase state flows into the evaporator 16 and adsorbs heat from the air flowing into the evaporator 16, so that the refrigerant is vaporized. The refrigerant vaporized in the evaporator 16 flows into the compressor 11 to be compressed again.

Figure 2:
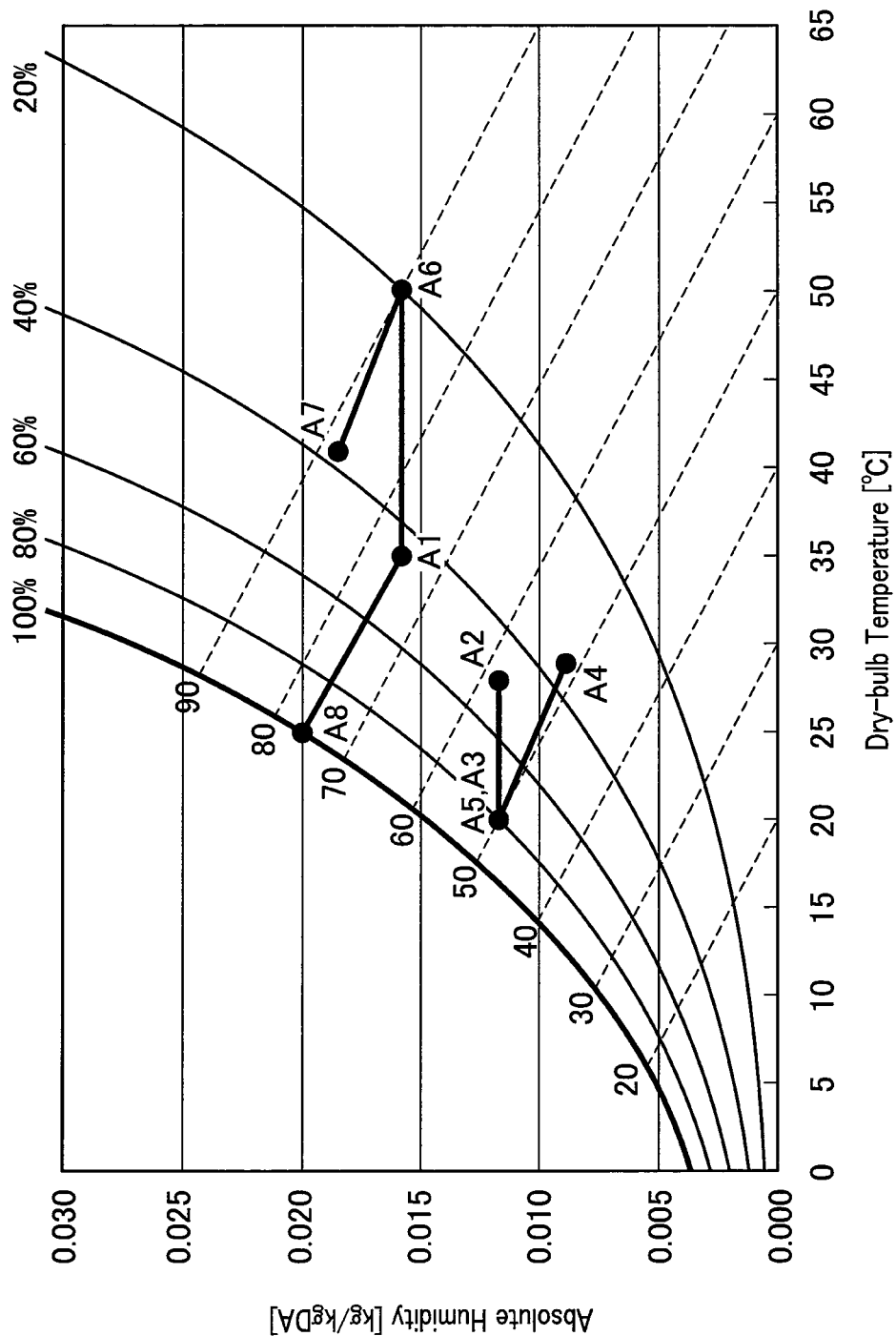
FIG. 2 is a diagram showing the humidity ratio of air flowing in the air conditioner of the first embodiment and dry-bulb temperature.

Next, the flow of air under cooling operation in the air conditioner 10 will be described with reference to FIGS. 1 and 2. FIG. 2 shows the dry-bulb temperature of air and absolute humidity of air-state at points A1 to A8 in FIG. 1.

In the state of A1 in FIG. 2 (for example, dry-bulb temperature=about 35° C., absolute humidity=about 60%), the outdoor air from ambient of a building is sucked by the first air-suction blower 42 and the second air-suction blower 41, passed from the air suction port 9a through the total heat exchanger 3 provided to the suction/exhaust port 9 and taken into the air conditioner 101. The outdoor air A1 which is passed through the total heat exchanger 3 and taken into the air conditioner 101 is firstly introduced into the chamber 6 between the total heat exchanger 3 and the evaporator 16.

The return air RA from the air-conditioned room 5 is passed through an exhaust passage 8 and introduced into the chamber 6 by air blowing force of the first exhaust blower 43, the first air suction blower 42 and the second air suction blower 41. The return air RA introduced into the chamber 6 passes through the total heat exchanger 3, and is mixed with the outdoor air A1 introduced through the total heat exchanger 3 into the chamber 6, so that the mixed air is obtained at a point A2 (the state of A2 of FIG. 2, for example, dry-bulb temperature=about 26° C., absolute humidity=about 45%).

The mixed air in the state of A2 in the chamber 6 splits into three directions. In the first direction (the direction shown by the arrow from A2 to A5) in which the mixed air passes through the evaporator 16, bypasses the desiccant rotor 2 and then returns to the air-conditioned room 5. In a second direction (the direction shown by the arrow from A2 to A4) in which the mixed air successively flows through the evaporator 16 and the moisture adsorbing area 2a of the desiccant rotor 2 in this order and then returns to the air-conditioned room 5. In a third direction (the direction shown by the arrow from A2 to A1) in which the mixed air is passed through the total heat exchanger 3 and then exhausted to the outside.

The air conditioner 101 introduces outdoor air A1 from the air suction port 9a into the air conditioner 101 so that the amount of the outdoor air A1 is equal to the amount of the air mixture (exhaust air EA) which flows in the third direction and is exhausted to the outside, thereby performing air ventilation. At this time, in the total heat exchanger 3, heat exchange is performed between the return air RA at the low temperature and the outdoor air A1, so that the enthalpy of the outdoor air A1 is reduced. Furthermore, the air flowing in the direction from the point A1 to the point A3 and then to the point A5 is cooled by the refrigerant circulating in the refrigeration cycle 10 in the evaporator 16 because the refrigerant concerned draws heat from the air, so that the state of the air concerned is set to the state of A3 and A5 of FIG. 2 (for example, dry-bulb temperature=about 20° C., absolute temperature=about 45%).

The air at the point A3 flows through the moisture adsorbing area 2a of the desiccant rotor 2 while the moisture in the air is adsorbed in the moisture adsorbing area 2a of the desiccant rotor 2, and reaches the point A4, so that the air falls into the state of A4 of FIG. 2 (for example, dry-bulb temperature=about 28° C., absolute humidity=about 30%). At this time, the air at the point A4 is increased in temperature by heat of adsorption, so that the air is set to a higher temperature state than the air at the point A3, and then the air is introduced into an introducing passage 32 through the first air-suction blower 42. The air at the point A5 bypasses the desiccant rotor 2, and is directly led to the introducing passage 32 through the second air-suction blower 41. Accordingly, the air reaching the point A4 and the point A5 joins together in the introducing passage 32, whereby the air is set to a set temperature and humidity of the air conditioner 101 and introduced into the air-conditioned room 5.

According to this construction, ventilation (exchange) is performed between the air SA in the air-conditioned room 5 and the outdoor air A1 to keep the air quality in the air-conditioned room 5, and also the low-temperature return air RA and the outdoor air A1 are heat-exchanged with each other in the total heat exchanger 3, whereby the enthalpy of the outdoor air A1 can be lowered. Furthermore, the return air RA and the outdoor air A1 which is passed through the total heat exchanger 3 and reduced in enthalpy is mixed together in the chamber 6, and thus the air in the chamber 6 is lower in temperature and humidity than the outdoor air A1. Furthermore, the ventilation (exchange) is performed between the return air RA and the outdoor air A1 through the total heat exchanger 3, whereby moisture vapor can be suppressed from being introduced into the air conditioner 101 due to ventilation and the heat load can be reduced. Therefore, the loads on the evaporator 16 and the desiccant rotor 2 can be reduced even under a high-humidity outdoor condition and an operation condition of a small sensible heat load, and the efficiency of the refrigeration cycle 10 can be enhanced.

Furthermore, the air at the point A3, which is introduced into the moisture adsorbing area 2a of the desiccant rotor 2, is cooled in the evaporator 16, and thus the temperature of the air is set to be low. Therefore, in order to increase the relative humidity difference between the moisture adsorbing area 2 and the regenerating area 2b, it is required to increase the temperature of the air to be blown to the regenerating area 2b. For example, when the temperature of air passing through the moisture adsorbing area 2a side is equal to about 20° C., the temperature of regenerated air passing through the regenerating area 2b side is equal to a low temperature of about 50° C. or the like, and thus the desiccant rotor 2 has a sufficient dehumidifying performance (capacity). Accordingly, the desiccant rotor 2 can be efficiently regenerated even when the load of the refrigeration cycle 10 is reduced.

Next, the regeneration processing of the desiccant rotor and the heat exhaust processing of the refrigeration cycle 10 will be described.

First, the outdoor air which is blown to the refrigeration upstream side radiator 13 of the radiator 12 by the second exhaust air blower 44 is heat-exchanged with the high-temperature refrigerant flowing through the refrigerant upstream side radiator 13, and then reaches the point A6, so that the outdoor air concerned falls into the state of the A6 of FIG. 2. The high-temperature air at the point A6 is introduced into the regenerating area 2b of the desiccant rotor 2. The moisture which is adsorbed (adsorbed) from the air in the moisture adsorbing area 2a of the desiccant rotor 2 is shifted to the regenerating area 2b by rotation of the desiccant rotor 2, and then desorbed by the outdoor air under the state of A6 under which the temperature of the outdoor air is increased by heat of the refrigerant upstream side radiator 13 in the regenerating area 2b, whereby the desiccant rotor 2 is regenerated. Furthermore, the high-temperature and high-humidity air which passes through the regenerating area 2b, adsorbs the moisture of the desiccant rotor 2 and reaches the point A7 falls into the state of A7 of FIG. 2, and then is exhausted through the air passage 34 to the outside.

According to this construction, the desiccant rotor 2 can be regenerated by using exhaust heat of the radiator 12. Furthermore, the radiator 12 is sectioned into sub radiators (the refrigerant upstream side radiator 13 and the refrigerant downstream side radiator 14). Therefore, the high-temperature refrigerant which has been discharged from the compressor 11 is made to flow through the refrigerant upstream side radiator 13 so that the outdoor air is heated by utilizing heat radiated from the high-temperature refrigerant flowing through the refrigerant upstream side radiator 13 and high-temperature regeneration air to flow through the desiccant rotor 2 can be generated. Accordingly, the relative humidity difference between the moisture adsorbing area 2a of the desiccant rotor 2 and the regenerating area 2b can be increased, and the dehumidifying capacity of the desiccant rotor 2 can be enhanced, in order to increase the temperature of the refrigerant flowing through the radiator 12, it is not necessary to increase the load of the refrigeration cycle 10, and the desiccant rotor 2 can be sufficiently regenerated by air temperature which can be increased by the heat radiated from the radiator of the heat pump.

The outdoor air A1 introduced into the air conditioner 101 exchange heat with the return air RA from the air-conditioned room 5 and set to be low in temperature and humidity in the total heat exchanger 3. The outdoor air A1 and the return air RA is mixed together in the chamber 6, and falls into a lower temperature and lower humidity state. Therefore, the air at the point A2 which is blown to the evaporator 16 is lower in temperature and humidity than the outdoor air A1, and thus it can reduce the latent heat and sensible heat load in the evaporator 16. The air at the point A2 is lower in absolute humidity and dew point than the outdoor air A1.

The refrigerant downstream side radiator 14 is provided with the water sprinkling (spraying) unit 17. The water evaporative cooling sprinkled (sprayed) from the water sprinkling unit 17 is applied to the outdoor air blown to the refrigerant downstream side radiator 14 by the third exhaust blower 45 to cool the outdoor air concerned, and the outdoor air passing through the refrigerant downstream side radiator 14 reaches the point A8. The outdoor air passing through the refrigerant downstream side radiator 14 falls into the low-temperature and high-humidity state of A8 of FIG. 2, and it passes through the air passage 35 and exhausted to the outside.

According to this construction, the refrigerant flowing through the refrigeration cycle 10 can be efficiently cooled by using heat of vaporization in the refrigerant downstream side radiator 14. Therefore, the heat of the refrigerant circulating in the refrigeration cycle 10 is efficiently radiated, whereby the refrigerant can be supercooled, and the efficiency of the refrigeration cycle 10 can be enhanced.

When the radiator 12 is sectioned into the refrigerant upstream side radiator 13 and the refrigerant downstream side radiator 14, there exists an optimum distribution ratio (the number of stages or the whole area of the radiator) between the regeneration air generating side (refrigerant upstream side radiator 13) and the exhaust heat processing side (refrigerant downstream side radiator 14) of the desiccant rotor 2. When the regeneration air generating side is excessively small, it is required to increase the pressure of the compressor side to obtain sufficient regeneration air temperature. When the exhaust heat processing side is excessively small, the refrigerant temperature at the outlet of the radiator 12 increases, so that the efficiency of the refrigeration cycle 10 is lowered at any rate.

Figure 3:
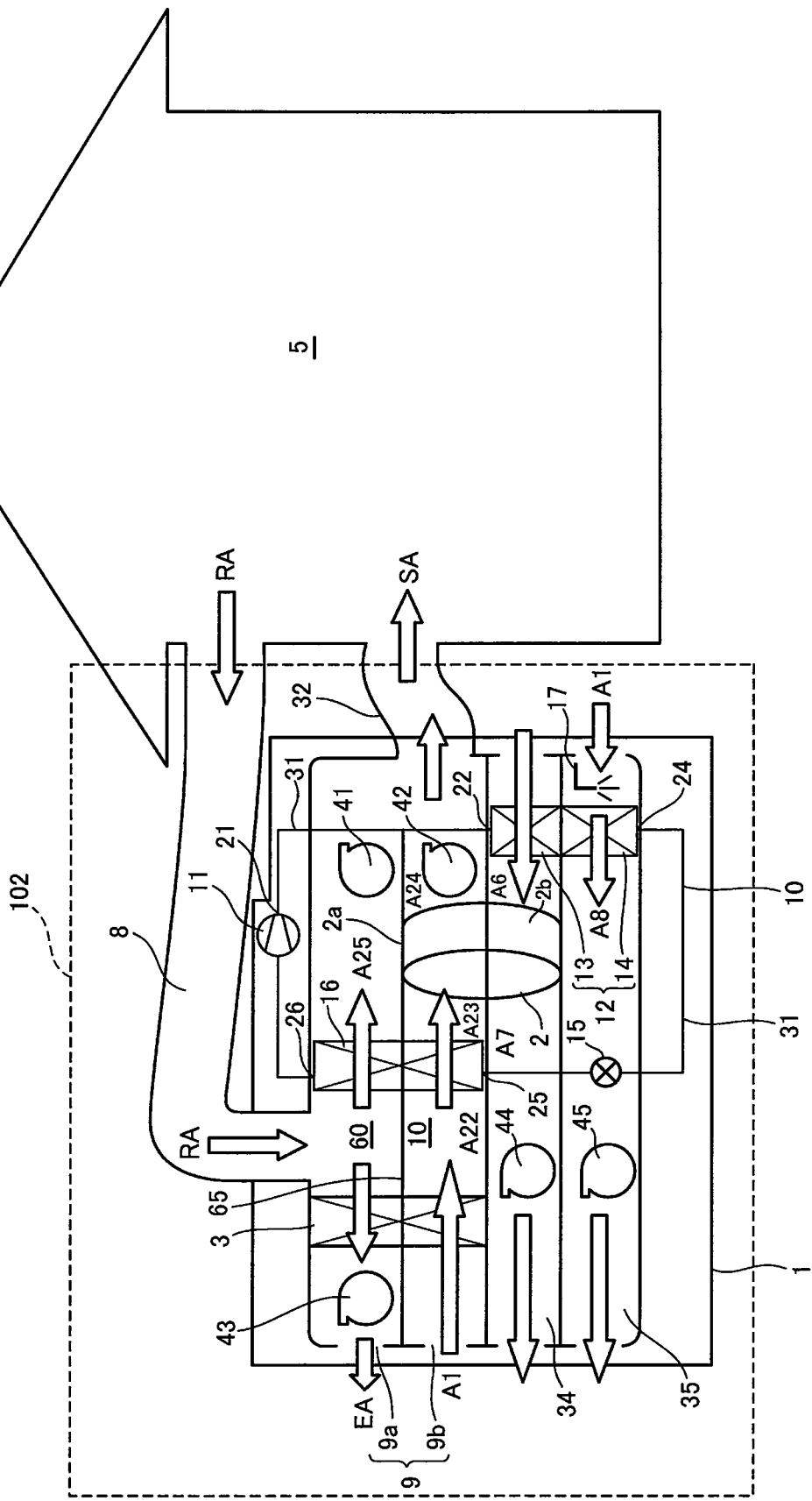
FIG. 3 is a diagram showing the construction of an air conditioner according to a second embodiment to which the present invention is applied.

Next, the second embodiment will be described. FIG. 3 is a diagram showing the construction of an air conditioner 102 according to the second embodiment to which the present invention is applied. In FIG. 3, the same parts as described with respect to the first embodiment are represented by the same reference numerals, and the description thereof is omitted.

In this embodiment, the return air RA from the air-conditioned room 5 is passed through the exhaust passage 8, and introduced into a chamber 60 provided in the air conditioner 102. The return air RA introduced into the chamber 60 is partially passed through the total heat exchanger 3, and exhausted from the exhaust port 9b through the first exhaust blower 43 to the outside. At this time, the outdoor A1 whose amount is equal to that of the exhaust air EA is taken from the air-suction port 9b into the air conditioner 1, thereby performing ventilation. The outdoor air A1 taken into the air conditioner 1 is passed through the total heat exchanger 3 and heat-exchanged with the return air RA, so that the temperature of the outdoor air A1 is lowered. Then, the outdoor air A1 is introduced into a chamber 10, and reaches a point A22. The air at the point A22 subsequently passes through the evaporator 16 to be lowered in temperature, and flows into the moisture adsorbing area 2a of the desiccant rotor 2. The air at the point A24 after it passes through the moisture adsorbing area 2a is set to be a higher temperature and lower humidity state than the air at a point A23 which passes through the evaporator 16, and the air at the point A24 is introduced into the introducing passage 32 by the first air-suction blower 42.

A part of the return air RA introduced into the chamber 60 is sucked by the second air-suction blower 41 so that it flows through the evaporator 16, bypasses the desiccant rotor 2, and then reaches the point A25. The air at the point A25 is introduced to the introducing passage 32 by the second air-suction blower 41, and is mixed with the air at the point A24, passing through the moisture adsorbing area 2a of the desiccant rotor 2 in the introducing passage 32. Thereafter, the confluent air is then introduced into the air-conditioned room 5. A partition wall 65 is provided between the chamber 60 and the chamber 70, and the return air RA introduced into the chamber 60 is prevented from being mixed with the outdoor air introduced into the chamber 70.

According to this construction, the low-temperature and low-humidity return air RA can be introduced through the evaporator 16 into the air-conditioned room 5 again, so that the latent heat load and the sensible heat load of the evaporator 16 can be reduced, and the efficiency of the refrigeration cycle can be enhanced. Furthermore, the low-temperature return air RA and the outdoor air A1 can be heat-exchanged with each other in the total heat exchanger 3. Therefore, in addition to the ventilation, the outdoor air A1 can be taken into the air conditioner 102 while the enthalpy of the outdoor air A1 is lowered. Therefore, the sensible heat load and the latent heat load of the evaporator 16 can be reduced. Furthermore, the air, which is reduced in temperature and humidity in the total heat exchanger 3, flows through the evaporator 16, and thus the temperature and the humidity of the air passing through the moisture adsorbing area 2a of the desiccant rotor 2 can be reduced as compared with a case where outdoor air is taken into the air conditioner 102 without being passed through the total heat exchanger 3 and the take-in outdoor air is made to directly flows through the evaporator 16 and the desiccant rotor 2 in this order. Therefore, the load of the desiccant rotor 2 can be reduced, and also the relative humidity difference between the moisture adsorbing area 2a and the regenerating area 2b can be increased, and the dehumidifying capacity of the desiccant rotor 2 can be enhanced.

Figure 4:
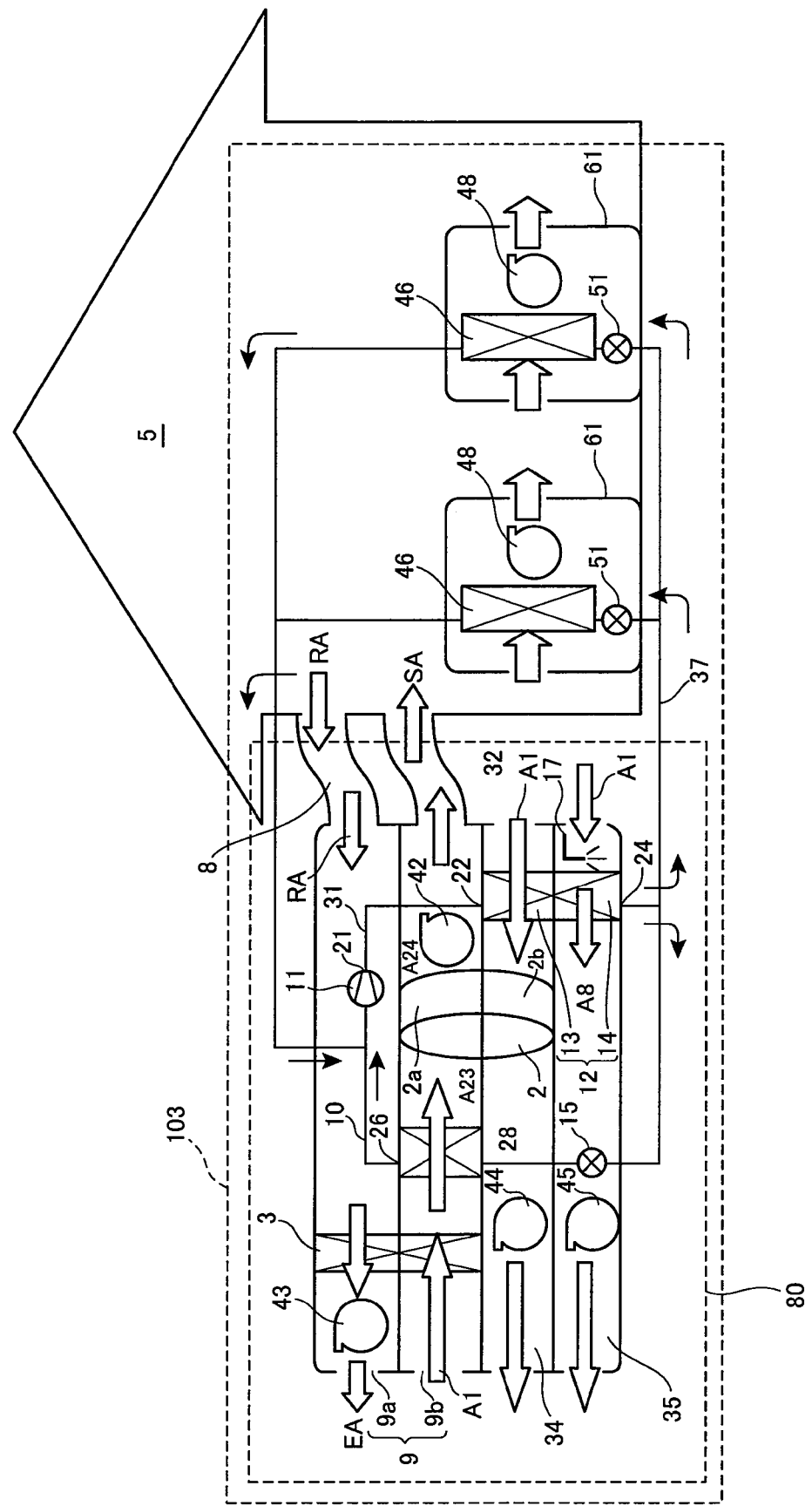
FIG. 4 is a diagram showing the construction of an air conditioner according to a third embodiment to which the present invention is applied.

Next, the third embodiment will be described. FIG. 4 is a diagram showing the construction of an air conditioner 103 according to the third embodiment to which the present invention is applied. In FIG. 4, the same parts as described with reference to the first and second embodiments are represented by the same reference numerals, and the description thereof is omitted.

In this embodiment, the air conditioner 103 comprises an outdoor unit 89 including a refrigeration cycle 10, a desiccant rotor 2 for adsorbing (adsorbing) moisture in air, a total heat exchanger 3 provided to the air suction/exhaust port 9 of the air conditioner 101, and plural indoor units 61 connected to the outdoor unit 80 through a refrigerant pipe 37. The indoor unit 61 contains an indoor heat exchanger 46, and the indoor heat exchanger 46 is connected to the compressor 11 of the refrigeration cycle 10 in parallel to the evaporator 16.

Refrigerant flowing through the radiator 12 of the refrigeration cycle 10 repeats a cycle in which the refrigerant is divided into first refrigerant flowing in a direction of an arrow indicated by a solid line in FIG. 4 and passing through the refrigerant pipe 31 to the pressure-reducing device 15 and the evaporator 15 and second refrigerant passing through the refrigerant pipe 37 and flowing into the indoor units 61 to be supplied to pressure-reducing devices 51 and indoor heat exchangers 46, and the first refrigerant and the second refrigerant join together at the upstream side of the compressor 1 and are sucked into the compressor 11 again.

A third air-suction blower 48 is provided in the neighborhood of each indoor heat exchanger 46. Air SA, which is dehumidified in the moisture adsorbing area 2a of the desiccant rotor 2 in the outdoor unit 80, and then introduced into the air-conditioned room 5, is led to the indoor units 61 by the third air-suction blowers 48, cooled by the indoor heat exchangers 46 and then introduced into the air-conditioned room 5 again. Furthermore, return air RA from the air-conditioned room 5 is led to the exhaust passage 8 by the first exhaust blower 43, passed through the total heat exchanger 3, and then exhausted from the exhaust port 9b to the outside.

According to this construction, air which is passed through the moisture adsorbing area 2a of the desiccant rotor 2 to be increased in dry-bulb temperature can be cooled in the indoor heat exchanger 46 of each indoor unit 61 disposed in the air-conditioned room 5 again and introduced into the air-conditioned room 5. Therefore, by using the construction that air which is passed through the total heat exchanger 3 and the evaporator 16 to be lowered in temperature and humidity is made to flow into the moisture adsorbing area 2a of the desiccant rotor 2 to thereby enhance the dehumidifying capacity (performance) of the desiccant rotor 2, for example when plural rooms exist in the air-conditioned room 5, each indoor unit 61 is disposed in each room so that air can be supplied into each room while the each room's air is individually conditioned.

Next, a fourth embodiment according to the present invention will be described.

Figure 5:
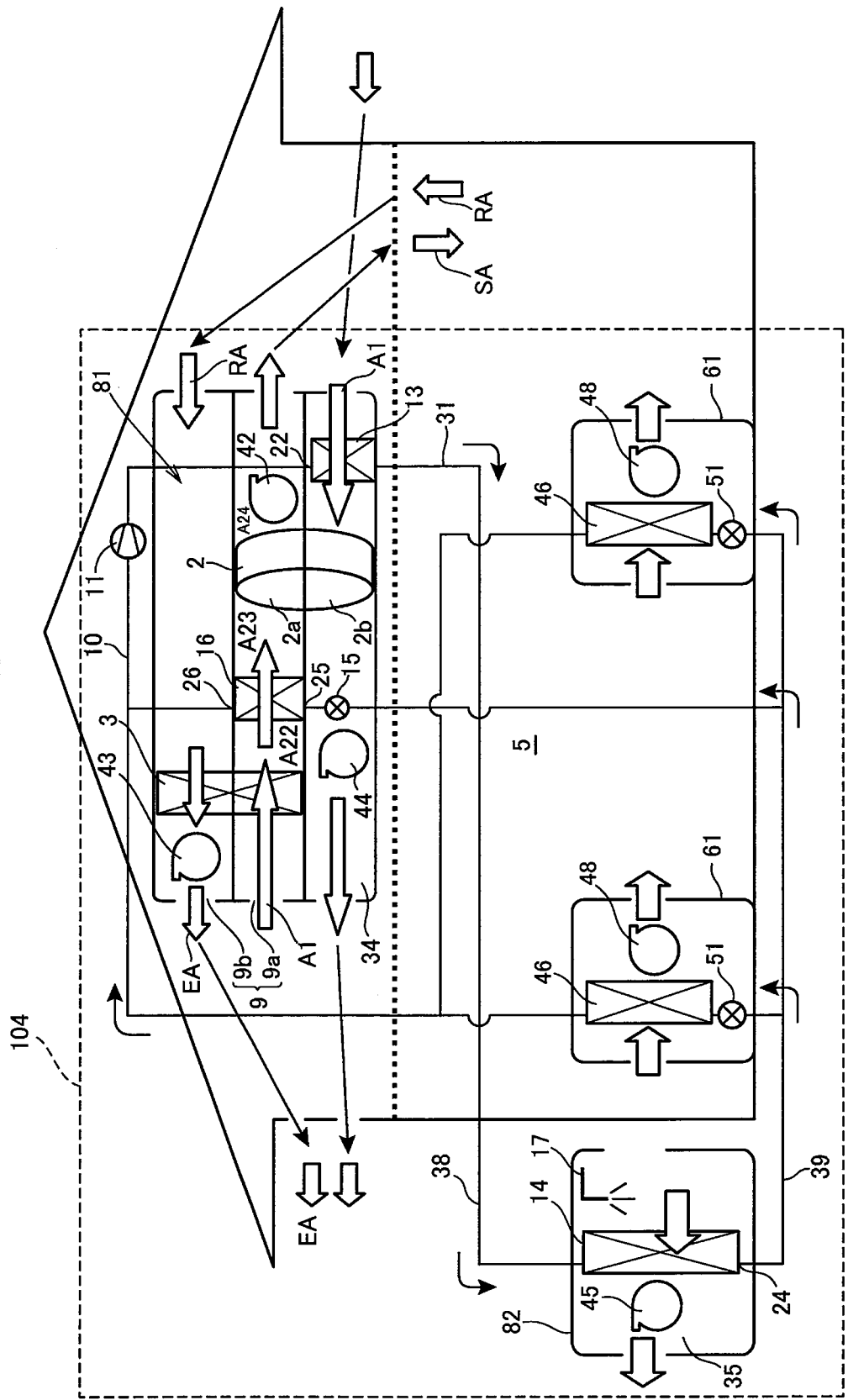
FIG. 5 is a diagram showing the construction of an air conditioner according to a fourth embodiment to which the present invention is applied.

FIG. 5 is a diagram showing the construction of an air conditioner 104 according to the fourth embodiment of the present invention. In FIG. 5, the same parts as described with reference to the first, second and third embodiments are represented by the same reference numerals, and the description thereof is omitted.

In this embodiment, an air conditioner 104 includes a ventilation unit 81, which is installed on the roof or within the attic or crawlspace of a building, has a refrigeration cycle 10, a desiccant rotor 2 for adsorbing moisture in air, and a total heat exchanger 3 provided to the air suction/exhaust port 9 of the air conditioner 104. The air conditioner 104 also includes an outdoor unit 82, which is connected to the ventilation unit 81 through the refrigerant pipe 38, has a refrigerant downstream side radiator 14, and is disposed at the outside of the air-conditioned room 5. The air conditioner 104 also includes plural indoor units 61, which are connected to the outdoor unit 82 through the refrigerant pipe 34.

Refrigerant flowing out from a refrigerant upstream side radiator 13 of the refrigeration cycle 10 flows in a direction of a solid-line arrow in FIG. 5. Refrigerant which is cooled by heat of evaporation and radiates heat to the outside in the refrigerant downstream side radiator 14 flows out from a refrigerant outlet 24 of the outdoor unit 82 into the refrigerant pipe 39. The refrigerant flowing out from the outdoor unit 82 and passing through the refrigerant pipe 39 is led through the pressure-reducing devices 51 to the indoor heat exchangers 46 of the indoor units 61, and also led through a pressure-reducing device 15 to the evaporator 16.

According to this construction, the refrigerant downstream side radiator 14 having the water sprinkling unit 17 is connected to the ventilation unit 81 through the refrigerant pipes 31, 38, 39, and thus the refrigerant downstream side radiator 14 can be disposed separately from the ventilation unit 81. Therefore, when a sufficient space for the air conditioner 104 to be disposed cannot be secured at the outside of the air-conditioned room 5, the ventilation unit 81 of the air conditioner 104 may be disposed on the roof or within the attic or crawlspace of the air-conditioned room 5, and only the outdoor unit 82 which is required to discharge water from the water sprinkling unit 17 may be disposed outdoors. Therefore, the discharged water from the water sprinkling unit 17 can be easily maintained. Accordingly, even when the mount space is limited, the air conditioner 104 of the present invention can be set up by disposing the ventilation unit of the air conditioner 104 on the roof or within the attic or crawlspace.

Figure 6:
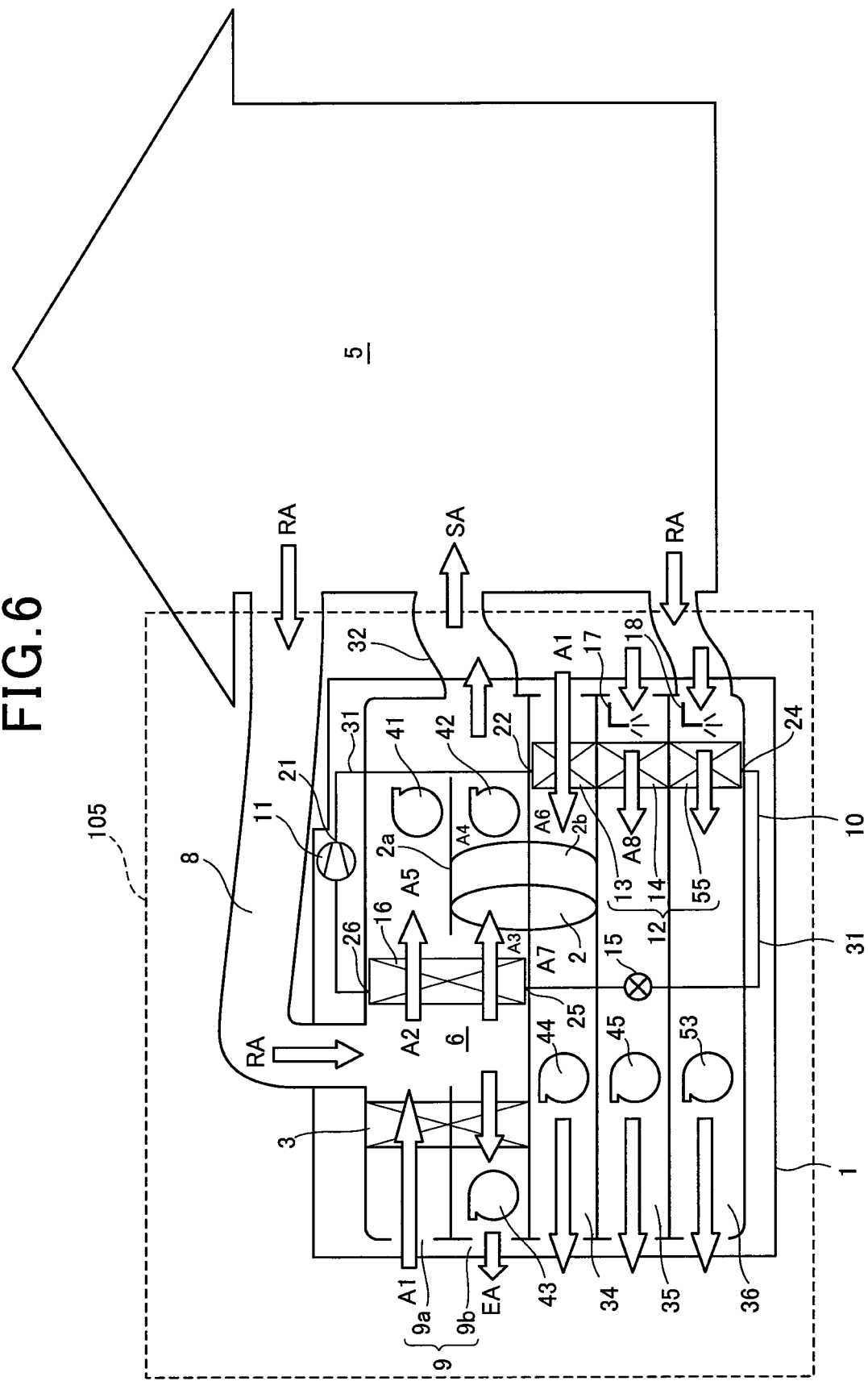
FIG. 6 is a diagram showing the construction of an air conditioner according to a fifth embodiment to which the present invention is applied.

Next, a fifth embodiment of the present invention will be described. FIG. 6 is a diagram showing the construction of an air conditioner 105 of the fifth embodiment according to the present invention. In FIG. 6, the same parts as described with respect to the first embodiment are represented by the same reference numerals, and the description thereof is omitted.

In the air conditioner 105 of this embodiment, the radiator 12 of the refrigeration cycle 10 has the refrigerant upstream side radiator 13, the refrigerant downstream side radiator 14 and an auxiliary radiator which is provided at the most refrigerant downstream side (i.e., at the most downstream side with respect to the refrigerant flowing direction). A second water sprinkling unit 18 is provided in the neighborhood of the auxiliary radiator 55. That is, the water sprinkling units are provided to the radiators located at the downstream side with respect to the refrigerant flowing direction. The auxiliary radiator 55 is provided in an air passage 36, and a fourth exhaust blower 53 is provided at the exhaust side of the air passage 36. The air passage 36 is connected to an introducing passage 33, and return air RA from the air-conditioned room 5 is led from the introducing passage 33 to the auxiliary radiator 55 by the fourth exhaust blower 53.

According to this construction, refrigerant cooled in the refrigerant downstream side radiator 14 is made to flow to the auxiliary radiator 55 and low-temperature return air RA is made to flow to the auxiliary radiator 55, so that heat of the refrigerant can be radiated by the heat of the indoor air to cool the refrigerant, and the refrigerant can be further cooled by heat of evaporation based on the second water sprinkling unit 18. Therefore, the refrigerant flowing through the auxiliary radiator 55 falls into a supercooled low-temperature state. The supercooled refrigerant passes through the evaporator 16, and thus the air cooling efficiency in the evaporator 16 can be enhanced, so that the efficiency of the refrigeration cycle 10 can be enhanced.

The foregoing description of the embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skill in the art to understand the invention for various embodiments and with the various modifications as are suited to the particular use contemplated. It is intended that the scope of the invention be defined by the following claims and their equivalents.

What is claimed is:

1. An air conditioner comprising:
    a refrigeration cycle including a compressor, a radiator, a pressure-reducing device and an evaporator;
    a heat exchanger for performing heat-exchange between outdoor air and air under cooling operation using the evaporator for a room to be air-conditioned, and for ventilating the room to be air-conditioned;
    a chamber disposed between the heat exchanger and the evaporator; and
    a desiccant rotor having a moisture adsorbing area for adsorbing moisture in the outdoor air when the outdoor air is introduced, and regenerating the moisture adsorbing area by heat of the radiator, the outdoor air successively flowing through the heat exchanger, the evaporator and the moisture adsorbing area in this order and then entering the room to be air-conditioned,
    wherein air exhausted from the room to be air-conditioned is mixed in the chamber with outdoor air introduced through the heat exchanger so as to form mixed air and the mixed air flows in first to third directions, the first direction being defined by a direction along which the mixed air passes through the evaporator, bypasses the desiccant rotor and then returns to the room to be air-conditioned, the second direction being defined by a direction along which the mixed air successively flows through the evaporator and the moisture adsorbing area in this order and then returns to the room to be air-conditioned, and the third direction being defined by a direction along which the mixed air is passed through the heat exchanger and then exhausted to the outside of the air conditioner.

2. The air conditioner according to claim 1, further comprising a single housing, wherein the refrigeration cycle, the heat exchanger and the desiccant rotor are integrally mounted in the housing, and the housing and the room to be air-conditioned are connected to each other through an air exhaust passage and an air introducing passage.

3. The air conditioner according to claim 2, wherein the housing is installed within an attic or a crawlspace.

4. The air conditioner according to claim 1, further comprising one or plural indoor units each of which contains an indoor heat exchanger, the indoor heat exchanger being connected to the compressor in parallel to the evaporator.

5. The air conditioner according to claim 1, wherein:
    the radiator is sectioned into sub radiators arranged along a refrigerant flowing direction, and
    the moisture adsorbing area of the desiccant rotor is regenerated by heat of one of the sub radiators located at a most upstream side with respect to the refrigerant flowing direction.

6. The air conditioner according to claim 5, wherein one of the sub radiators located at a most downstream side with respect to the refrigerant flowing direction is provided with a water sprinkling unit for sprinkling water.

7. The air conditioner according to claim 5, wherein the sub radiators arranged in series along the refrigerant flowing direction.

8. The air conditioner according to claim 5, wherein one of the sub radiators located at a most downstream side with respect to the refrigerant flowing direction is connected to the room to be air-conditioned through an air introducing passage, whereby the one of the sub radiators located at the most downstream side radiates heat by using heat of air from the room-conditioned.

9. An air conditioner comprising:
    a refrigeration cycle including a compressor, a radiator, a pressure-reducing device and an evaporator;
    a heat exchanger for performing heat-exchange between outdoor air and air under cooling operation using the evaporator for a room to be air-conditioned, and for ventilating the room to be air-conditioned; and
    a desiccant rotor having a moisture adsorbing area for adsorbing moisture in the outdoor air when the outdoor air is introduced, and regenerating the moisture adsorbing area by heat of the radiator, the outdoor air successively flowing through the heat exchanger, the evaporator and the moisture adsorbing area in this order and then entering the room to be air-conditioned, wherein air exhausted from the room to be air-conditioned is passed through the heat exchanger and then exhausted to the outside of the air conditioner, and a part of the air exhausted from the room to be air-conditioned passes through the evaporator, bypasses the desiccant rotor and then returns to the room to be air-conditioned, and outdoor air introduced through the heat exchanger successively flows through the evaporator and the moisture adsorbing area in this order and then enters the room to be air-conditioned.

10. The air conditioner according to claim 9, further comprising one or plural indoor units each of which contains an indoor heat exchanger, the indoor heat exchanger being connected to the compressor in parallel to the evaporator.

11. The air conditioner according to claim 10, wherein the housing is installed within a attic or a crawlspace.

12. The air conditioner according to claim 9, wherein the outdoor air introduced through the heat exchanger successively flows through the evaporator and the moisture adsorbing area in this order and then enters the room to be air-conditioned, without being mixed with the air exhausted from the room to be air-conditioned.

13. The air conditioner according to claim 9, wherein:
the radiator is sectioned into sub radiators arranged along a refrigerant flowing direction, and
the moisture adsorbing area of the desiccant rotor is regenerated by heat of one of the sub radiators located at a most upstream side with respect to the refrigerant flowing direction.

14. The air conditioner according to claim 13, wherein one of the sub radiators located at a most downstream side with respect to the refrigerant flowing direction is provided with a water sprinkling unit for sprinkling water.

15. The air conditioner according to claim 13, wherein the sub radiators arranged in series along the refrigerant flowing direction.

16. The air conditioner according to claim 13, wherein one of the sub radiators located at a most downstream side with respect to the refrigerant flowing direction is connected to the room to be air-conditioned through an air introducing passage, whereby the one of the sub radiators located at the most downstream side radiates heat by using heat of air from the room-conditioned.

17. An air conditioner comprising:
a refrigeration cycle including a compressor, a radiator, a pressure-reducing device and an evaporator;
a heat exchanger for performing heat-exchange between outdoor air and air under cooling operation using the evaporator for a room to be air-conditioned, and for ventilating the room to be air-conditioned; and
a desiccant rotor having a moisture adsorbing area for adsorbing moisture in the outdoor air when the outdoor air is introduced, the outdoor air successively flowing through the heat exchanger, the evaporator and the moisture adsorbing area in this order and then entering the room to be air-conditioned,
wherein air exhausted from the room to be air-conditioned passes through the evaporator then returns to the room to be air-conditioned, without passing through the desiccant rotor.

18. The air conditioner according to claim 17, wherein the air exhausted from the room to be air-conditioned is mixed with outdoor air introduced through the heat exchanger so as to form mixed air and at least a part of the mixed air passes through the evaporator then returns to the room to be air-conditioned, without passing through the desiccant rotor.

19. The air conditioner according to claim 17, wherein the outdoor air successively flows through the heat exchanger, the evaporator and the moisture adsorbing area in this order and then entering the room to be air-conditioned, without being mixed with the air exhausted from the room to be air-conditioned.

20. The air conditioner according to claim 17, further comprising one or plural indoor units each of which contains an indoor heat exchanger, the indoor heat exchanger being connected to the compressor in parallel to the evaporator.

* * * * *